U

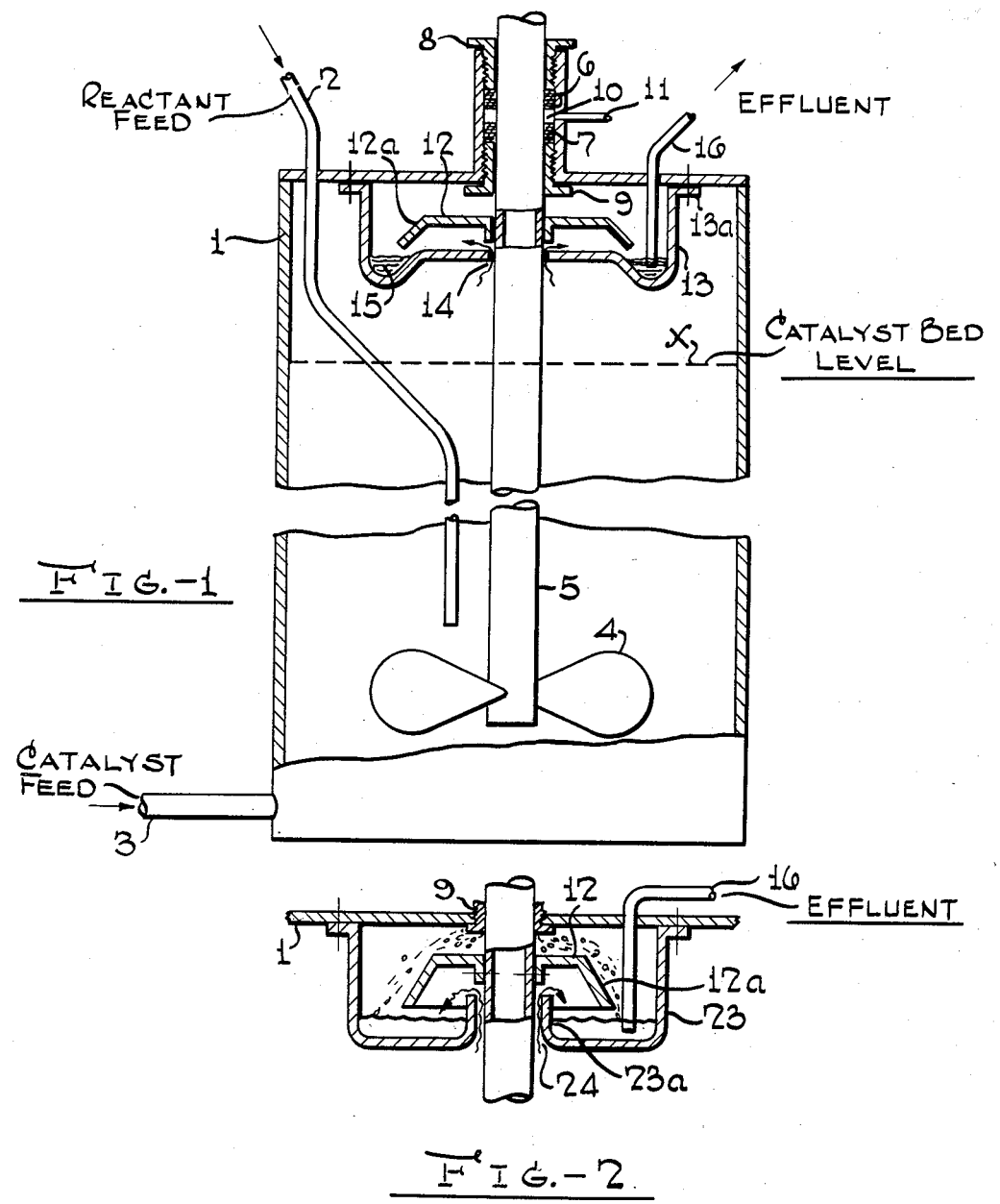

United States Patent Office 2,758,855
Patented Aug. 14, 1956

2,758,855

PACKING GLAND SEAL

Francis R. Russell, Mountainside, and Arendt R. Koos, Elizabeth, N. J., assignors to Esso Research and Engineering Company, a corporation of Delaware Application July 24, 1952, Serial No. 300,668

3 Claims. (Cl. 286—7)

The present invention relates to an apparatus for entrapment and collection of liquid leakage along a rotating shaft. The invention is particularly concerned with leakage which may occur through a lubricated packing gland such as may be employed for a stirrer shaft in process apparatus, and where the leakage of such lubricant into the process vessel may be detrimental to process materials confined therein. More specifically, the invention is concerned with a problem such as that which is created by lubricant leakage into a reactor employed as in the slurry polymerization of normally gaseous olefins, accomplished in the presence of a solid phosphoric acid catalyst. In such an operation, the catalyst, which may be phosphoric acid deposited on kieselguhr, silica gel, or the like, may be maintained as a suspension or slurry in the presence of reactant fluids by means of an agitating device driven by a rotating shaft extended through a wall of the reactor vessel. In the lubrication of such a shaft, a certain amount of leakage of lubricant into reactor along the shaft is bound to occur. This leakage has been found to contaminate the catalyst material and to poison it so as to substatnially destroy its effectiveness, and the efficiency of the operation. According to the present invention, such lubricant leakage is trapped and collected at the point of leakage and substantially out of contact with the material which might possibly be contaminated thereby. For the purpose of illustrating the possible usefulness of the present invention, it is described with reference to its employment in conjunction with apparatus for the slurry polymerization of olefins in the presence of a finely divided solid polymerization material. Obviously, the invention may be employed in conjunction with any analogous apparatus or operating conditions.

This invention and its objects may be more fully understood from the following description when read in conjunction with the accompanying drawings, in which Fig. 1 is a semi-diagrammatic illustration of apparatus according to the invention and shown partly in vertical section, and Fig. 2 is a vertical section through a portion of a structure similar to that shown in Fig. 1 illustrating another form of a device according to the present invention.

Referring to the drawings in greater detail, the numeral 1 designates a reactor vessel representative of one such as might be employed in a slurry polymerization operation. The vessel is provided with an inlet conduit 2 for introduction of olefinic materials to be subjected to polymerization conditions in the reactor. The numeral 3 indicates an inlet conduit for catalytic materials such as phosphoric acid on kieselguhr. This catalyst is introduced in finely divided powdered form through the conduit 3 to establish a certain level of suspended or fluidized catalyst within the vessel substantially as indicated by the dotted line X in the drawing. In order to maintain the body of catalyst material in a fluidized condition within the vessel, there is provided a stirrer such as a bladed stirrer element 4 mounted on a rotatable shaft 5. As shown, the shaft 5 extends vertically out of the vessel through a packing gland seal at the upper end thereof. The seal is formed by means of compressible packing material 6 disposed in the shaftway 7 and held therein under pressure of the opposite packing gland nuts 8 and 9 threaded into the passageway from opposite ends thereof. In order to provide lubrication for the shaft and to some extent aid in resisting pressure from within vessel 1, the seal structure includes a lantern ring element 10 and a conduit means 11 for the introduction of a lubricant under a pressure substantially equivalent to, or slightly higher than the pressure existing within the vessel.

Within the vessel 1 and immediately beyond the packing gland nut 9 a substantially horizontal annular disc element 12 is secured to the shaft 5 for rotation therewith. Preferably, this member 12 is provided with a frusto-conical skirt portion 12a secured to and dependent from the peripheral edge of the disc by its smaller base end. Also, the disc 12 is preferably secured to the shaft in substantially fluid-tight relation. In addition to the disc 12, there is provided a collector trough or cup 13 secured by its upper edge portion to the upper wall of the vessel as by means of the flange 13a thereon. The collector cup is provided with a passageway 14 through its bottom wall portion of slightly greater diameter than the diameter of the shaft, the shaft 5 being extended therethrough. The collector cup is also provided with a recess portion 15 along the peripheral wall thereof, which, in the construction illustrated, may be formed by an indented central portion surrounding the passageway 14. An outlet conduit 16 opens from the cup member 13 through the upper wall of the vessel 1. As shown, the inner end of the conduit 16 is extended into the trough or recessed portion of the cup.

In the form of the apparatus illustrated by Fig. 2, a cup-shaped member 23 is provided with a concentric tubular portion 23a, surrounding the central opening in the member 23, and providing an elongated passageway 24a, opening at its upper end above the lower edge portion of the skirt 12a on the disc 12. In the apparatus as shown, the inner end of the outlet conduit 16 extends into the trough formed between tubular portion 23a and the peripheral wall of the cup shaped member 23, with the end of said conduit terminating below the upper edge of portion 23a.

In operation, any lubricant leakage which may occur will tend to enter the vessel wall through the packing gland and follow shaft 5. Upon contact with the disc or plate member 12 the centrifugal effect of the rotating disc will throw the liquid outwardly toward the inner wall portion of the cup-shaped member 13 or 23 to collect in the trough provided by these members as by the recess 15 of member 13. Product effluent will also enter the enclosure of the cup-shaped members 13 and 23 as by way of the passageway 14 or the pasasgeway 24 to be discharged therefrom through the outlet conduit 16. As soon as a sufficient amount of lubricant leakage may be collected in members 13 or 23 so as to cover the end of the outlet conduit 16, it will be carried outwardly therethrough along with the flow of product effluent. Normally it is contemplated that the volume of leakage will be in comparatively small proportion to the volume of product effluent, and further that while the lubricant material may have a detrimental effect upon the catalyst material employed or even the reactant materials themselves, such an effect will not be noticeable on the product withdrawn from the vessel. In the event that the volume of leakage is such as to require it, provision may be made to separate the lubricant material from the product effluent as by means of settling or fractionation.

What is claimed is:

1. In a pressure vessel, having an upper end wall, a lubricating packing gland seal extending vertically through and supported in said upper end wall, wherein said packing gland seal has an inner end exposed in said vessel inwardly of said upper end wall, and a rotatable shaft extended vertically downward into said vessel, through said packing gland seal, and wherein said vessel is adapted to receive a body of process materials with a vapor space between the upper level of said materials and said upper end wall, a combined means for withdrawing from said vapor space, a vaporous product effluent derived from said body of process materials and also for collecting and removing lubricant leakage from said seal flowing downwardly along said shaft, which means comprises in combination, a walled enclosure for the upper end of said shaft and the inner end of said packing gland seal, which enclosure includes a vertical wall portion secured to and dependent from said vessel upper end wall into said vapor space, concentric with said shaft, and an annular bottom wall portion concentric with said shaft and radially spaced therefrom, said bottom wall portion and said shaft defining between them an annular passageway freely communicating between the vapor space of said vessel and said enclosure, an annular liquid receiving trough at least partially defined by said bottom wall portion, an annular disc mounted in right angular relation to said shaft within said enclosure intermediate the inner end of said packing gland seal and said enclosure bottom wall portion, in fixed, substantially fluid-tight relation to said shaft, said disc being rotatable with said shaft and extending radially outward from said shaft beyond the inner periphery of said enclosure annular bottom wall portion into radially spaced relation to said enclosure vertical wall portion, and a combined outlet for said vaporous product effluent and said lubricant leakage, consisting of a common outlet conduit for said product effluent and lubricant leakage which conduit is extended within said trough in vertically spaced relation to the bottom of said trough, whereby lubricant leakage collected in said trough and said product effluent entering said enclosure from said vapor space by way of said annular passageway are discharged from said enclosure through the common outlet conduit under the pressure of said vessel.

2. An apparatus according to claim 1, wherein said liquid receiving trough is an upwardly opening, recess defined in said enclosure bottom wall at the outer periphery thereof and immediately adjacent said enclosure vertical wall portion thereof.

3. An apparatus according to claim 1, wherein said annular bottom wall portion includes an upturned tubular extension at the inner periphery thereof, said extension having an upper end terminating in vertically spaced relation to said disc, and wherein said trough is defined laterally between said enclosure vertical wall portion and said tubular extension, with said enclosure bottom wall portion providing the bottom of said trough.

References Cited in the file of this patent

UNITED STATES PATENTS

| 581,113 | Hanna et al. | Apr. 20, 1897 |
| 1,546,894 | Hauck | July 21, 1925 |
| 1,829,206 | Wilson | Oct. 27, 1931 |
| 1,888,475 | Schmitz | Nov. 22, 1932 |
| 2,003,003 | Marbury | May 28, 1935 |
| 2,215,449 | Alexander et al. | Sept. 24, 1940 |
| 2,312,525 | Curtis | Mar. 2, 1943 |
| 2,537,600 | O'Daniel | Jan. 9, 1951 |
| 2,583,671 | Schmitter | Jan. 29, 1952 |

FOREIGN PATENTS

| 481,832 | Germany | Aug. 31, 1929 |
| 835,666 | Germany | Apr. 3, 1952 |